United States Patent
Montoya

(10) Patent No.: US 6,299,679 B1
(45) Date of Patent: Oct. 9, 2001

(54) READY-TO-USE STUCCO COMPOSITION AND METHOD

(75) Inventor: Antony S. Montoya, Albuquerque, NM (US)

(73) Assignee: Western Mobile New Mexico, Inc., Albuquerque, NM (US)

( * ) Notice: Subject to any disclaimer, the term of this patent is extended or adjusted under 35 U.S.C. 154(b) by 0 days.

(21) Appl. No.: 09/395,499

(22) Filed: Sep. 14, 1999

(51) Int. Cl.[7] .......................... C04B 24/10; C04B 24/00; C04B 26/00
(52) U.S. Cl. ................................. 106/730; 106/724
(58) Field of Search ................... 106/724, 730, 106/802, 804, 805

(56) References Cited

U.S. PATENT DOCUMENTS

| | | | |
|---|---|---|---|
| 3,219,467 | 11/1965 | Redican et al. | 106/703 |
| 3,746,680 | 7/1973 | Boricheski | 523/113 |
| 3,852,083 | 12/1974 | Yang | 524/5 |
| 3,869,415 | 3/1975 | Williams | 106/778 |
| 3,936,313 | 2/1976 | Ericson | 106/780 |
| 4,028,125 | * 6/1977 | Martin | 106/717 |
| 4,028,127 | 6/1977 | Maske et al. | 106/779 |
| 4,036,659 | * 7/1977 | Stude | 106/717 |
| 4,054,461 | * 10/1977 | Martin | 106/717 |
| 4,054,462 | * 10/1977 | Stude | 106/717 |
| 4,299,790 | 11/1981 | Greenberg | 264/299 |
| 5,482,551 | 1/1996 | Morris et al. | 106/772 |
| 5,525,153 | 6/1996 | Cosola | 106/697 |
| 5,534,059 | 7/1996 | Immordino, Jr. | 106/778 |
| 5,567,236 | 10/1996 | Schapira et al. | 106/728 |
| 5,576,378 | 11/1996 | Kuhlmann et al. | 524/523 |
| 5,613,558 | * 3/1997 | Dillenbeck, III | 166/293 |
| 5,653,797 | 8/1997 | Patel | 106/781 |
| 5,718,759 | 2/1998 | Stav et al. | 106/735 |
| 5,779,786 | 7/1998 | Patel | 106/781 |
| 5,814,146 | 9/1998 | Maggio et al. | 106/802 |
| 5,846,316 | 12/1998 | Rice | 106/735 |
| 5,858,083 | 1/1999 | Stav et al. | 106/735 |
| 5,879,446 | 3/1999 | Patel | 106/781 |

OTHER PUBLICATIONS

*The Manufacture of Cement,* http://www.portcement.org/indhow.htm, Jun. 25, 1999, pp. 1 and 2.

Melander, John M. and Isberner, Albert W. Jr.; *Portland Cement Plaster (Stucco) Manual,* Portland Cement Association, 1996, pp. 1–50, (no month).

Evaluation Report for *Fastwall Fiber–Reinforced Stucco Wall System,* prepared for El Rey Stucco Co. Inc., ICBO Evaluation Service, Inc., Reissued May 1, 1998, pp. 1–6.

* cited by examiner

Primary Examiner—Anthony Green
(74) Attorney, Agent, or Firm—Townsend and Townsend and Crew LLP

(57) ABSTRACT

The present invention provides a ready-to-use stucco compositions wherein the components in the composition are selected such that the compositions retain certain desired properties over a predetermined time before the stucco sets. The compositions can be prepared at one site and transferred to a job site typically without further modifications. Methods of preparing and using such compositions are also provided.

35 Claims, 1 Drawing Sheet

READY-TO-USE STUCCO COMPOSITION AND METHOD

FIELD OF THE INVENTION

The present invention generally relates to the production and use of cementitious materials which are ready-to-use and wherein the composition of the materials is controlled to retain certain desired properties over a predetermined time period before the composition sets or hardens. The present invention further relates to formulations of components that can be mixed with cementitious material to achieve the desired compositions. Finally, the present invention relates to methods of preparing and using such cementitious materials. Although the present invention broadly relates to cement-based compositions, the invention relates particularly to stucco compositions that are applied to various external surfaces.

BACKGROUND OF THE INVENTION

A variety of different cementitious materials are used in construction including mortars, slags, grouts, concrete and stucco. Often these construction materials are composed of several different components. To facilitate their use, preferably these materials are ready-mixed, and, even more preferably, ready-to-use. The so-called "ready mixed" cementitious materials are those in which most, if not all, of the dry components are premixed at a manufacturing facility or during transport to a job site. In some instances, ready-mixed cementitious materials may also be mixed with the requisite amount of water to carry out the hydration reaction which results in hardening of the cementitious material. In such instances, the material is also "ready-to-use," i.e., capable of being used without any further additions or mixing.

Although certain cementitious materials, such as cements and mortars for example, are typically delivered ready-to-use, to date a ready-to-use stucco formulation has not been developed. Stucco, or portland cement plaster, is a combination of portland cement-based cementitious material(s) and aggregate (typically sand), mixed with a suitable amount of water to form a plastic mass which will adhere to a surface and harden, preserving any form and texture imposed on it while plastic. As used herein, the term "stucco" refers to portland cement plaster used for coating the exterior surfaces of buildings which falls under ICBOES acceptance criteria AC-11 (Cementitious Exterior Coatings). Stucco is usually applied in one or more coats over metal reinforcement with or without backing. The finish coat is either trowelled, floated, or rough textured. Suitable substrates over which stucco may be applied include, for example, expanded polystyrene (EPS) insulation board, extruded polystyrene insulation foam (XEPS), gypsum sheathing, fiberboard, oriented strand board or plywood, mounted on exterior walls of wood, masonry or steel stud construction. Stucco in the freshly mixed state is a plastic, workable material. It can be applied by hand or machine to conform to any shape.

Stucco is typically applied in three coats. The first coat is called a "base coat" or "scratch coat." This coat is typically about ⅜" thick and is left rough to promote good adherence between it and the second coat, which is generally referred to as the "brown coat." The brown coat is also approximately ⅜ inch thick. The third coat, variously referred to as the "finish coat" or "color coat," is applied over the second coat. Collectively, the three coats are about ¾ inch thick.

Currently, contractors typically prepare stucco by purchasing bags containing a blend of all the dry ingredients. On site, workers add the necessary water to achieve a mixture with a consistency which is sufficiently fluid so that it can be evenly spread on a wall, while still having enough tackiness that the material adheres to the surface to which it is applied. In some instances, the various components of the stucco composition are purchased individually, mixed on site and then the water added. This approach, however, is inefficient and results in unnecessary labor costs. It would be more efficient to have a ready-to-use stucco prepared at a facility dedicated to preparing stucco.

Another challenge encountered with present stucco compositions and methods are the limitations in controlling the time before the stucco hardens to such an extent that it can no longer be applied. Once water is added to presently available stucco mixes, the stucco must be applied within a limited time period before it dries out and is incapable of being spread. A preferred approach would utilize a trained operator at a central processing facility to add the appropriate additives in order to tailor the period during which the stucco retains sufficient workability in accordance with the time requirements of each job.

Lack of uniformity in stucco preparation at the job site can also be a problem under current methods. Using trained personnel at a central processing facility can significantly reduce this problem.

As noted above, various cementitious materials have been developed which the goal of providing a product having certain improved characteristics. For example, U.S. Pat. No. 5,567,236 describes compositions which can be used to enhance the rheological properties of cement-based materials. However, the additives used to achieve this end are believed to differ from the additives used in the stucco of the present invention.

A variety of patents describe calcium sulfate-based compositions designed to have certain improved characteristics. Examples of such patents include U.S. Pat. Nos. 5,879,446; 5,779,786 and 5,653,797 to Patel or Patel et al.; U.S. Pat. No. 3,869,415 to Williams; U.S. Pat. No. 3,852,083 to Yang; U.S. Pat. No. 3,746,680 to Boricheski; U.S. Pat. No. 3,936,313 to Ericson; U.S. Pat. No. 4,299,790 to Greenberg; U.S. Pat. No. 5,482,551 to Morris et al.; U.S. Pat. No. 5,534,059 to Immordino, Jr.; U.S. Pat. No. 5,718,759 to Stav et al.; and U.S. Pat. No. 4,028,127 to Maske et al. However, the cementitious compositions of the present invention are calcium carbonate and calcium silicate based compositions (approximately ⅓ calcium carbonate and ⅔ calcium silicate) rather than calcium sulfate based compositions. The hydration chemistry, setting process, and mechanical characteristics for these two types of materials is quite different.

SUMMARY OF THE INVENTION

The present invention provides methods for preparing a ready-to-use stucco composition that has a useable life of a desired duration and that can be prepared without the need for alteration at the work site. The useful life of the stucco is at least equal to a pre-application period, a period that includes delivery of the stucco to a job site, and the time necessary to apply the stucco for a particular job. The methods generally involve mixing together at an off-site location a portland cement-containing hydraulic cement, plaster sand, viscosifier, retarder and water to form a stucco composition having predetermined properties. The retarder is present in an amount sufficient to provide the stucco composition with a predetermined useful life during which the stucco is workable. The viscosifier is present in an amount sufficient to retain enough water during the useful life to allow the stucco composition to set after said application period.

Methods for using the stucco compositions of the invention are also provided. These methods typically involve preparing a stucco composition comprising portland cement-containing hydraulic cement, plaster sand, a viscosifier, a retarder and water at a first location, such as a concrete manufacturing or processing facility, for example. The stucco is transferred to a second location (e.g., the worksite). The retarder is present in an amount sufficient to provide the stucco composition with a predetermined useful life during which said stucco composition is workable. The viscosifier is present in an amount sufficient to retain enough water throughout the useful life of the stucco so that it can still harden after the application period. The stucco is placed into a container at the second location, where it is taken from the containers and applied to a surface at the second location.

The invention further provides stucco compositions that have a useful life of at least four hours at an application temperature of from 50 to 100° F. The composition includes: (a) a portland cement-containing hydraulic cement and plaster sand having a particle size no greater than U.S. sieve #4, wherein the ratio of the hydraulic cement and the plaster sand ranges from 1:3 to 1:5; (b) retarder ranging in concentration from 1–60 oz/CWT; (c) a viscosifier varying in concentration from 1–5 lbs/cubic yard when the viscosifier is either hydroxypropyl methylcellulose or polysaccharide gum, and from 1 to 100 g/cubic yard when the viscosifier is an ethylene oxide polymer; and (d) water (40 to 50 gallons/cubic yard).

DETAILED DESCRIPTION

I. General

Figure 1:
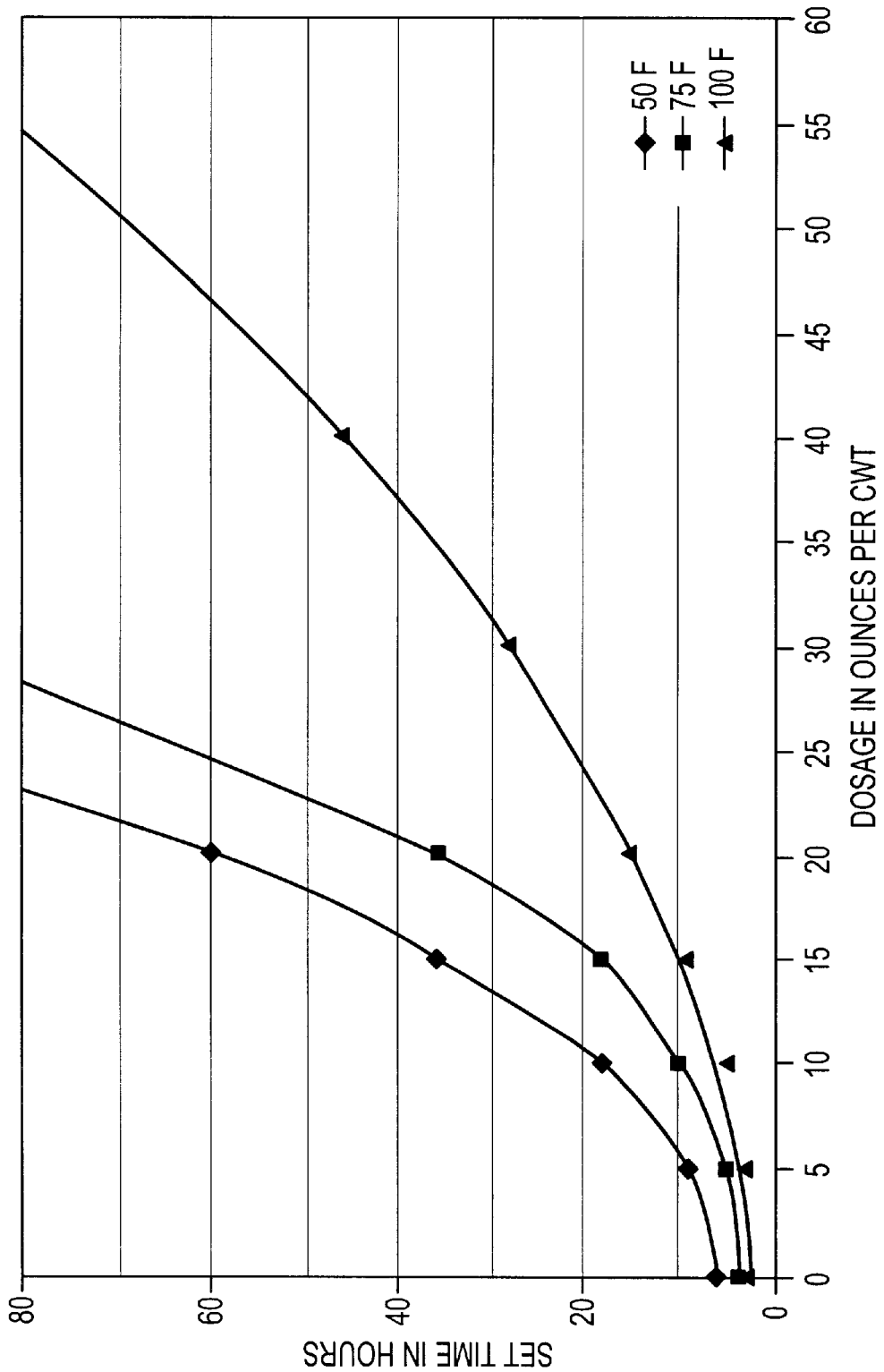
FIG. 1 is a chart showing the effect of different retarder concentrations on set time at three different temperatures.

The invention provides various stucco compositions that are formulated to have a certain predetermined useful life of sufficient duration that the stucco composition can be prepared at one location and transported to a second location where the composition is ready to use, typically without further modification. The useful life is also sufficient to allow the composition to be applied before it becomes unworkable. The invention further provides a method for preparing stucco that has a desired useful life, taking into account the effects of temperature, for example, on useable life. Methods of utilizing stucco having a desired useable life are also included in the present invention. The methods allow for the stucco to be prepared under consistent and strict quality control guidelines at a concrete manufacturing or processing facility, for example.

The challenges associated with preparing and using a ready-to-use stucco has meant that typically stucco is prepared at the job site from bags which contain the necessary dry ingredients but which lack water. One problem regarding the preparation of ready-to-use stucco compositions is the difficulty in formulating a composition that retains sufficient water after application has been completed so that the hydration reaction that hardens the stucco can occur. Without sufficient water to complete the hydration reaction, the stucco coat that forms is dry and powdery and has little strength or hardness. Because of this problem and difficulties in maintaining sufficient workability during application, stucco currently is typically prepared on site. As pointed out above, however, on-site preparation is inefficient, results in stucco having inconsistent properties and results in higher overall labor costs.

II. Compositions
A. General

According to the present invention, ready-to-use stucco compositions are provided that typically are pre-mixed by a manufacturer at an off-site location and applied after a substantial "pre-application period." The compositions are designed to have a desired useable life during which the composition remains in a plastic, workable state. During the pre-application period, the composition may be stored, dispensed and/or transported to the site at which it is to be used, preferably in a ready-mix concrete truck. Upon arrival at the site, the stucco composition is generally discharged into individual containers, (e.g. tubs or hoppers) containing a portion of the composition that is convenient for application. As used herein, the term "pre-application period" is defined as the period of time between the manufacture of the stucco composition at an off-site location and its initial application at the site, and includes the time required for various pre-application tasks such as dispensing, transportation and/or storage of the stucco composition.

The stucco compositions of the present invention are designed to have a particular time period or "useful life" during which the stucco remains plastic and "workable." The useable life is at least as long as the pre-application period and the entire application period, and can be longer. In general, the stucco should retain the properties of freshly mixed plaster, i.e., acceptable "adhesion", "cohesion" and "workability." "Adhesion" is the capability of the stucco composition to adhere to an identical or compatible material. "Cohesion" is the capability of the stucco composition to hold together or cling to itself and is typically measured by slump. "Workability" is generally the fluidity of the composition, which translates into the ease of application of the stucco at the site. Workability is measured by the "slump" of the composition. Slump is usually determined by a slump test using a slump cone, as specified in ASTM (American Society for Testing and Materials) standard C143-90a. This test essentially involves preparing an inverted cone of the composition and measuring how much the material drops down. In general, stucco has sufficient workability when it can be applied without fatiguing the laborer applying the stucco. Typically, stucco has acceptable workability when the slump ranges from 4" to 7".

In general, the stucco compositions of the present invention are formulated to meet certain specifications determined by several parameters, e.g., the pre-application time period, customer specifications and ambient conditions. Although it is possible to manufacture products of the invention on a case-by-case basis, preferably the customer selects from several standard mix formulations that are pre-designed to meet certain standard conditions that are prevalent in the market area. For example, certain ready-to-use stucco products according to the present invention are designed to have a slump of 4"–7" and to have a useable life of from a couple hours to several days. For example, for small jobs the stucco composition may have a useable life of less than 8 hours, such as up to 5 hours. For many jobs the useable life of the stucco is adjusted to be at least 10 hours. Other compositions are designed to have a useful life of at least 24 hours. Still other compositions have a useful life of at least 48 hours or at least 72 hours.

After application at the job site, the stucco composition must have sufficient retained moisture to "set" properly, i.e., change from a plastic, workable state to a solid, hardened, rigid state through the hydration of the hydraulic cement in the composition. The term "set" is sometimes modified by the terms "initial" and "final" to designate certain arbitrary degrees of hardening. As used herein, a stucco material has "set" when an applied stucco coat has set to the desired degree of hardness, e.g., so that a subsequent layer can be satisfactorily applied over the previous layer or the layer can serve as the final coat. Improperly set stucco may exhibit unacceptable strength and durability.

Freshly applied stucco compositions of the present invention may be kept moist and at a favorable temperature for a suitable period (i.e., "cured") following application. Curing can be used to assure satisfactory hydration and carbonation of the cementitious materials and proper hardening of the stucco.

In its most general aspects, the stucco compositions of the present invention comprise hydraulic cement, plaster sand, water, a retarder and a viscosifier. The retarder is present in an amount sufficient to provide the desired useful life for the stucco. The viscosifier is present in a sufficient amount so that at the end of the application period there is still enough water in the stucco to complete the hydration reaction that hardens the stucco. Certain compositions may also include optional ingredients such as fibers, shrinkage-reducing agents, water reducing agents, air-entraining agents and other admixtures known to the cementitious arts to tailor the properties of the composition to other specifications.

B. Hydraulic Cement

"Hydraulic" cement is a cement that reacts with water to harden. Hydraulic cements for the practice of the present invention contain portland cement, which is a finely ground, manufactured mineral (roughly $\frac{1}{3}$ calcium carbonate and $\frac{2}{3}$ calcium silicate) that complies with ASTM Designation C 150). The manufacture of portland cement consists of the mining of limestone and small amounts of clay and silica, followed by crushing and burning in a kiln. Type I and Type II portland cements are used in many of the compositions of the present invention. Type I is general purpose portland cement and Type II is modified so that it has slower heat liberation during hydration and improved resistance to sulfate attack, as required in certain geographical areas. In some compositions the portland cement component is Type S masonry cement complying with ASTM designation C 91–97 and Federal Specifications SS-C-1960/1. Type S masonry cement contains approximately 50% type I–II portland cement and 50% interground limestone, and, with water retention of about 77%, has a higher water demand than Type I or II portland cement. Because of the higher water content, stuccos prepared from Type S masonry cement are best applied to relatively porous surfaces. It is contemplated that 100% Type I or II portland cement may also be used as the hydraulic cement in the present invention, particularly when the resulting stucco is to be applied to a substrate that is not as porous as cement block, for example, paper. The preferred Type S portland cement has a 325-mesh residue of about 1.3%. Air entrainment is about 13–15%. These minute air bubbles are well-distributed throughout the stucco during mixing and improve the plasticity of the fresh stucco and increase the freeze-thaw durability of the hardened stucco. Type S masonry cement is commercially available from several suppliers, for example, Rio Grande Portland Cement Corporation.

C. Water

The water used to prepare the stucco compositions of the present invention should be clean and free of harmful amounts of any mineral or organic substances that would discolor or affect the set of the stucco or cause corrosion of metal lath or accessories. Water from a domestic water supply usually is suitable. The combination of cement, air and water is sometimes referred to as "cement paste."

D. Sand

The amount and kind of sand component greatly affect the quality of the resulting stucco since sand takes up nearly the entire volume of the hardened stucco, whereas the cement paste fills the voids or spaces between the sand particles. In certain compositions, the sand component is fine particle plaster sand conforming to ASTM designation C-897. Coarser aggregates of plaster sand generally consist of hard quartz, granite and felsites. Finer aggregates generally consist of hard quartz, feldspars and coarse aggregate fragments. The sand for the practice of the present invention typically is clean and free from deleterious amounts of loam, clay, silt, soluble salts and organic matter. The particle size of the sand has been found to be important in avoiding clogging of delivery equipment, in the ease of applying the stucco and in the strength of the stucco coat. Hence, the sand typically has a particle size no larger than U.S. sieve size #4. During the manufacturing of stucco, care is taken to screen the sand, including just prior to mixing it with the other dry ingredients. Typically, sand is present in a cement to sand ratio of 1:3 to 1:5. In some instances, the ratio is 1:3.75 to 1:4. The ratio in certain other instances is 1:3.9. Sand known as "Placitas" sand (so named because it is obtained from the Placitas Pit in New Mexico) has been found to give good results and is available from Western Mobile New Mexico, Inc.

E. Retarders

Retarders used in the compositions of the present invention retard the hydration reaction of the hydraulic cement component of the stucco mixture when it is mixed with water and therefore delays the set of the stucco. The concentration of the retarders in the composition is sufficient to provide a desired useful life which is at least equivalent to the pre-application and application periods. Suitable retarders include those satisfying ASTM C-494. Specific examples of useful retarders include a hydration control admixture marketed under the trademark RECOVER by Grace Construction Products and DELVO manufactured by Master Builder. Typically, the concentration of retarder is less than 60 oz/CWT (CWT is an abbreviation for per hundred weight of dry cement; thus, concentrations expressed on this basis are the amounts per 100 pounds of dry cement). In other instances, retarder concentration is less than 20 oz/CWT; in certain other compositions the concentration is less than 10 oz/CWT. In still other compositions, the retarder is less than 5 oz/CWT. The amount of retarder added depends upon the length of the useable life desired, temperature and humidity for example. The amount of retarder necessary to obtain a stucco having a certain useable life as a function of temperature can be determined using FIG. 1 for example (see Example II for additional details).

F. Viscosifiers

Viscosifiers suitable for the present invention comprise various known plasticizers, water-retention agents and gelling agents that have the ability to bind up free water in the retarded stucco composition so that the composition does not dry out from water evaporation during the pre-application period. Examples of different viscosifiers that are suitable in the compositions of the invention include ethylene oxide polymers, (e.g., POLY-OX from Union Carbide), hydroxypropyl methylcellulose, (e.g., MEHTO-CEL 240 from Dow Chemical Company), various polysaccharide gums (e.g., KELCO-CRETE from Monsanto), and combinations thereof.

Hydroxypropyl methylcellulose has been found to have good plasticizing and water-retention properties, and is therefore well-suited for highly absorptive substrates such as cement block. Welan gums may be more suitable for less absorptive surfaces because of its low viscosity under shear stress, high viscosity under zero shear stress, and high water retention. Hydroxypropyl methyl cellulose and polysaccharide gums such as Welan Gum are typically added at 1–25 lbs/cubic yard. In other compositions the concentration range is from 5 to 25 lbs/ cubic yard. In still other compositions, the amount is 1–5 lbs/cubic yard. Considerably less ethylene oxide polymer is required as a viscosifier; in general, the concentration ranges from 1–100 g/cubic yard; in other compositions the range is from 1 to 10 g/cubic yard. In still other instances, the range is from 10 to 100 g/cubic yard. (A cubic yard refers to a 1 yard by 1 yard by 1 yard volume of stucco as measured shortly after all the components have been mixed and the stucco is still plastic and wet.)

G. Optional Additives

1. Fibers

Stucco compositions of the present invention may also optionally include small amounts of fibers of alkali resistant materials such as polypropylene, nylon, alkali resistant glass, etc. Particularly suitable polypropylene fibers for the practice of the present invention are available from Grace Construction Products under the trademark MICROFIBER. These fibers arc in collated, fibrillated form and comply with ASTM Designation C 1 116. A typical amount of fiber is about 0.1 to 5 pounds/cubic yard of stucco; in other compositions the amount is typically between 1 and 3 pounds/cubic yard; and in still other compositions the amount of fiber is approximately 1 to 1.5 pounds/cubic yard. Such fibers may be included in the stucco composition for a variety of reasons. For example, fibers improve plastic adhesion in all applications, and are particularly useful in "one-coat systems" in which the stucco is applied in one thick coat thereby eliminating the need for a scratch coat followed by a brown coat. Typically the one coat is applied at a thickness of ⅜" or greater, but can be thinner if desired by the applicator. In addition, fibers in the stucco composition improve cohesion of the composition at all points in the plasticity range.

Since there is a tendency among applicators to keep plasticity at the upper limit in order to avoid sore wrists, the addition of fiber will allow desired high plasticity while assuring that the necessary cohesiveness is retained. However, fiber in the composition may make it too cohesive and difficult to finish. Therefore, in some applications, fiber may be omitted, especially if a fine float finish is applied directly to the stucco. Fibers may also be added to the stucco composition to minimize shrinkage cracking. When stucco is applied over cement block walls that are more rigid than wood frame buildings, shrinkage cracking has a tendency to manifest itself over large areas, producing more microcracking and less macro-cracking; whereas, when stucco is placed over wire lath and paper, which has less physical restraint to cracking, cracking is more localized and larger cracks develop than over block walls.

2. Shrinkage Reducing Admixture

To minimize overall drying shrinkage and the resultant cracking on all wall types, it may beneficial to include an optional shrinkage reducing admixture in the stucco compositions of the present invention. Shrinkage reducing admixtures reduce shrinkage as the stucco dries. A particularly suitable shrinkage reducing admixture for the practice of the present invention is available from Grace Construction Products under the trademark ECLIPSE. Since it is available only in liquid from, this shrinkage reducing admixture is not suitable for use in prior art ready-mix stucco products, but is readily incorporated in the ready-to-use compositions of the present invention. Typical concentrations of a shrinking reducing admixture is from about 1 to 2.5% by weight of cement. In some instances, the concentration is about 1 to 1.5% by weight of cement.

3. Air Entraining Mixtures

An air entraining mixture can optionally be included within certain compositions of the invention. Air entraining admixtures are useful for entraining microscopic bubbles of air in the stucco matrix; such bubbles allow for expansion and contraction of the stucco and minimize damage due to freeze/thaw cycles. Examples of suitable air entraining mixtures include those marketed by Addiment and by Grace Construction Products under the trademark DARAVAIR 1000. The admixture, if added, is added so that the stucco contains 8 to 18% entrained air, more typically 11 to 15% entrained air, and in some instances about 13% entrained air. Air entraining admixtures typically have a concentration of about ½ to 5 oz/100 lbs. of cement, or 2–3 oz/100 lbs of cement.

4. Water-Reducing Admixtures

A water-reducing admixture is optionally included in some compositions of the invention. A water-reducing admixture is a mixture that functions to reduce the amount of water that must be added to the stucco, thereby decreasing shrinkage potential and enhancing strength. Suitable water-reducing admixtures that may be included in the compositions of the present invention include WRDA 64 and DARACHEM 65 sold by Grace Construction Products. Addition of a water reducing admixture is useful if it is determined that there is an excess amount of water in the composition. The concentration of water reducing agent that is added tends to range from 3 to 10 oz/100 lbs of cement, or from 3 to 6 oz/lbs of cement. Certain other compositions contain about 4–6 oz/100 lbs of cement.

Table I below provides a summary of the different components that can be used in the stucco compositions of the present invention; Table II summarizes certain specific compositions of the invention (see Example II).

TABLE I

Summary of Stucco Additives

| Material | Definition or Function | Primary Components | Brand Name | Concentration Dosage Rate |
|---|---|---|---|---|
| Viscosifiers: | Improve adhesion Improve plasticity and water retention, | HydroxylPropyl Methyl Cellulose. (Cellulose Ether) | METHOCEL (Dow) | 1–25 lb/cubic yard; typically 1–5 lbs/cubic yard. |
| | | Polysaccharide Gum | Welan Gum (Monsanto) | 1–25 lb/cubic yard; typically 1–5 lbs/cubic yard. |

TABLE I-continued

Summary of Stucco Additives

| Material | Definition or Function | Primary Components | Brand Name | Concentration Dosage Rate |
|---|---|---|---|---|
| | | Ethylene Oxide Polymer & Amorphous Silica | Poly-Ox (Union Carbide) | 1–100 g/cubic yard |
| Fibers (e.g., Poly-propylene Alkali resistant Fibers; ASTM C1116) | Improve adhesion Improve cohesion Mitigate cracking Improve ductility Improve flexibility | 100% Polypropylene microfilament & monofilament fiber. 100% Polypropylene coilated, fibrillated fiber. | MICROFIBER (Grace) Grace fiber (Grace) | up to 5 lb/cubic yard; typically 1–1.5 lbs/cubic yard up to 5 lb/cubic yard; typically 1–1.5 lb/cubic yard |
| Retarder (ASTM C-494) | Extends useable life | Aqueous chemical solution of proprietary components. | RECOVER (Grace) DELVO (Master Builder) | typically 0.5 to 80 ounces per 100 lbs of cement; more typically 0.5 to 60 ounces per 100 lbs of cement |
| Shrinkage reducing admixture | Reduces shrinkage due to drying of cement matrix by 25% to 50%. | Non-aqueous chemical solution of proprietary components. | ECLIPSE (Grace) | 1% to 2.5% by weight of cement. |
| Water Reducing Agents: (WRA) ASTM C-494 | Reduces water demand thereby decreasing shrinkage potential & enhancing strength. | Aqueous solutions of complex organic compounds. 65 | WRDA 64 (Grace) DARACHEM (Grace) | 3 to 6 ounces per 100 lbs of cement 3 to 10 ounces per 100 lbs of cement |
| Air entraining Agents: (AEA) ASTM C-260 | Entrains microscopic bubbles of air in stucco matrix to minimize damage due to freeze thaw cycles. | Aqueous solution of synthetic saponified rosins. | DARAVAN 1000 (Grace) | ½ to 5 ounces per 100 lbs of cement Sufficient to develop 4–8% air by volume. |
| Set Accellerator: "Non-Chloride" ASTM C-494 Type C | Decreases "set" times in cold weather and increases rate of strength development. | Aqueous solution of calcium nitrite and, or, calcium nitrate. | POLARSET (Grace) | 8 to 100 ounces per 100 lbs of cement. |
| Water Repellent | Imparts water "repellent" properties to hardened concrete. | Aqueous dispersion of sodium stearate and other water repellent compounds. | DARAPEL (Grace) | 3 to 6 ounces per 100 lbs of cement. |

III. Methods

The dry components comprising the stucco compositions of the present invention are typically assembled in a centrally located dry mix plant designed to preclude contamination, particularly of the portland cement and plaster sand. It is very important to assure that no contaminated sand (particles larger than U.S. sieve #4) be introduced into the mix, for example, by utilizing harp screens over the hoppers in the plant and/ or mix trucks, preferably with vibrators attached. Mixing of the ready-to-use stucco can be accomplished in truck mixers designed to mix and deliver plaster in accordance with National Ready Mix Association guidelines for dry batch plants.

Typically about one-half of the water and other aqueous components are added to the mix truck, the dry components are added and the remaining water and other aqueous components are then added with mixing. This prevents the dry components from sticking to the mixer. However, the order of addition is not critical. Due to the importance of cleanliness, daily rinsing of the trucks with retarder or some other solution to prevent buildup is highly recommended. If fibers are used in a pumped mix, it may be necessary to discharge the stucco directly into a pump hopper without the use of screens because of the tendency of the fibers to clog pump screens.

After batching at a central location, the ready-to-use stucco composition is typically delivered by ready-mix truck to the job site, where the composition is discharged into containers. One example of such containers are tubs containing about ⅓ cubic yards of stucco. It is contemplated that specially-designed hoppers similar to a concrete bucket can be also used. The discharge end of such hoppers are high enough to allow a wheelbarrow underneath, yet are low enough to allow a ready-mix truck to discharge into the top. The volume of such hoppers are about ½ cubic yard since a conical configuration is necessary to ensure material flows directly to the gate. In an alternative embodiment, the ready-to-use stucco composition may be mixed and discharged into tubs or hoppers at the plant. These containers of stucco are then delivered on flatbed trucks to one or more job sites and off-loaded, e.g. by forklift, for immediate use.

The following examples are presented to illustrate certain aspects of the invention and are intended solely to illustrate, but not limit, the invention.

EXAMPLE I

Stucco Compositions

Table I shows the composition of several stucco compositions of the present invention. These compositions were prepared by combining the portland cement-containing hydraulic cement and sand in the amounts shown in Table I. Approximately one half the necessary water was placed in a ready mix cement truck. As indicated above, it is preferred that the truck be rinsed prior to the addition of the cement and sand to avoid contamination, especially from large particles that might remain in the mixer. Sand was screened as it was introduced into the mixer and the hydraulic cement was then added. Once all the hydraulic cement and sand had been placed into the mixer, the remaining water and retarder, plus the viscosifier and fiber were added. As noted above, however, the order in which the various components are added is not critical. The resulting mixture was mixed in the ready mix truck. The stucco was discharged into containers and then applied to walls.

different temperatures were conducted using the same batch of stucco. Set time refers to the elapsed time beginning with the combination of dry and liquid components until the slump of the resulting stucco was reduced to 3" as measured according to ASTM C143-90a.

FIG. 1 shows the range of retarder necessary as a function of useable life or set time at three different temperatures. Appropriate amounts of retarder at other temperatures can be extrapolated based upon the data presented for the three temperatures. Although it is possible to use the chart to determine a specific retarder concentration for any given

TABLE II

Specific Stucco Compositions

| CODE | CEMENT (Type S Masonry in lbs) | SAND (Placites Plaster sand in lbs) | CEMENT/ SAND RATIO | WATER (gallons) | AIR (%) | RETARDER (oz./100 wt)$^a$ | FIBER (lbs/cubic yd)$^b$ | VISCOSIFIER |
|---|---|---|---|---|---|---|---|---|
| Stucco 2 | 605 | 2152 | 1:3.6 | 50 | 13 | 12 | 1.5 | 10 g/cubic yard$^c$ |
| Stucco 2b | 605 | 2152 | 1:3.6 | 50 | 13 | 12 | 1.5 | 13.3 g/cubic yard$^c$ |
| Stucco 2c | 605 | 2152 | 1:3.6 | 50 | 13 | 6 | 1.5 | 10 g/cubic yard$^c$ |
| 10400 | 490 | 2267 | 1:4.6 | 50 | 13 | 8 | 1 | 1 lb/cubic yard$^d$ |

$^1$Retarder is RECOVER made by Grace Construction Products. Oz/CWT means ounces of retarder per 100 lbs of dry cement.
$^b$Fiber is MICROFIBER by Grace Construction Products.
$^c$Viscosifier is DAREX PUMP AID manufactured by Grace Construction Products.
$^d$Viscosifier ls METHOCEL by Dow.

Stuccos having a cement/sand ratio of 1:3.6 tended to be somewhat sticky and more difficult to work with as compared to the mixtures containing less cement, e.g., cement/sand ratios of 1:4.6, although both compositions were useable.

EXAMPLE II

Retarder Concentration and Useable Life

A series of tests were conducted to ascertain the amount of retarder necessary to achieve a desired useable life for the certain stucco compositions of the present invention. Liquid components were prepared separately, including variable amounts of retarder (0 to 40 ounces/CWT of RECOVER (manufactured by Grace Construction Products) and sufficient water to give a total volume of 50 gallons. Roughly have of the liquid components were added to a mixer. Dry components were than added into the mixer. The dry components included 490 lbs. of Rio Grande Type S masonry cement, 2,267 lbs. of Placitas Plaster sand (satisfying ASTM C-897), 1.0 lbs/cubic yard of polypropylene fiber (satisfying ASTM C-1116; MICROFIBER by Grace Construction Products), and 1 lbs/cubic yard of viscosifier (DOW METHOCEL 240). The sand was screened to a particle size no greater than U.S. sieve #4. After the addition of the dry components into the mixer, the remaining liquid components were added.

A separate batch of stucco was prepared as just described for several different retarder concentrations (0, 5, 10, 15, 20, 30 and 40 oz/CWT). For each retarder concentration, a useable life time or set time was determined at three different temperatures (50, 75 and 100° F.). Trials at 50° F. were held within ±2° F. using a laboratory refrigerator; trials at 100° F. were held within ±2° F. using a laboratory oven. Trials at the temperature and useable life period, retarder concentrations within a certain percentage range of the determined value (e.g., 5%, 10%, or 15%) should give acceptable results as well, i.e., give a useable life within a range near that desired.

For example, Table III sets forth a range of retarder concentrations for several time periods that correspond to the time typically required to complete jobs of varying complexity. Ranges are also provided for the temperature extremes at which stucco is typically applied (i.e., 50 and 100° F.), as well as a more average temperature during application.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

TABLE III

Retarder Dosage and Useable Life

| USEABLE LIFE (hrs) | TEMP (° F.) | RETARDER CONC. (OZ/CWT) |
|---|---|---|
| at least 5 | 50–64 | 0–3 |
|  | 65–84 | 4–6 |
|  | 85–100 | 7–10 |
| at least 10 | 50–64 | 3–5 |
|  | 65–84 | 6–10 |
|  | 85–100 | 11–16 |

TABLE III-continued

Retarder Dosage and Useable Life

| USEABLE LIFE (hrs) | TEMP (° F.) | RETARDER CONC. (OZ/CWT) |
|---|---|---|
| at least 24 | 50–64 | 5–12 |
| | 65–84 | 13–18 |
| | 85–100 | 19–25 |
| at least 48 | 50–64 | 13–18 |
| | 65–84 | 19–30 |
| | 85–100 | 31–42 |
| at least 72 | 50–64 | 19–23 |
| | 65–84 | 24–37 |
| | 85–100 | 38–55 |

What is claimed is:

1. A method for preparing a ready-to-use stucco composition comprising:

mixing together at an off-site location a portland cement-containing hydraulic cement, a quantity of plaster sand, a viscosifier, a retarder and a quantity of water to form a stucco composition, wherein (a) said retarder is present in an amount sufficient to provide said stucco composition with a useful life during which said stucco composition is workable, said useful life of a duration that is at least equal to (i) a pre-application period, which includes delivery of said stucco composition to a job site; and (ii) an application period at said job site and (b) said viscosifier is present in an amount sufficient to retain enough water during said useful life to allow said stucco composition to set after said application period.

2. The method of claim 1, wherein the retarder satisfies the criteria for a retarder as set forth in ASTM C-494.

3. The method of claim 1, wherein said viscosifier is selected from the group consisting of hydroxypropyl methyl cellulose (cellulose ether), polysaccharide gum, and ethylene oxide polymer.

4. The method of claim 1, wherein said stucco composition further comprises a fiber for increasing adhesion of said stucco composition and cohesion between said stucco composition and a surface to which the stucco composition is applied.

5. The method of claim 4, wherein said fiber is a polypropylene fiber.

6. The method of claim 1, wherein said stucco composition further comprises one or more additives selected from the group consisting of a shrinkage reducing admixture, a water reducing agent, an air entraining agent and a set accelerator.

7. The method of claim 1, wherein said useful life is at least 5 hours, and wherein the amount of said retarder varies from 0 to 3 oz/CWT at an application temperature of between 50 to 64° F., varies from 4 to 6 oz/CWT at an application temperature between 65 and 84° F. and varies from 7 to 10 oz/CWT at an application temperature between 85 to 100° F.

8. The method of claim 1, wherein said useful life is at least 10 hours, and wherein the amount of said retarder varies from 3 to 5 oz/CWT at an application temperature of between 50 to 64° F., varies from 6 to 10 oz/CWT at an application temperature between 65 and 84° F. and varies from 11 to 16 oz/CWT at an application temperature between 85 to 100° F.

9. The method of claim 1, wherein said useful life is at least 24 hours, and wherein the amount of said retarder varies from 5 to 12 oz/CWT at a temperature of between 50 to 64° F., varies from 13 to 18 oz/CWT at between 65 and 84° F. and varies from 19 to 25 oz/CWT at between 85 to 100° F.

10. The method of claim 1, wherein said useful life is at least 48 hours, and wherein the amount of said retarder varies from 13 to 18 oz/CWT at a temperature of between 50 to 64° F., varies from 19 to 30 oz/CWT at between 65 and 84° F. and varies from 31 to 42 oz/CWT at between 85 to 100° F.

11. The method of claim 1, wherein the ratio of said hydraulic cement and said plaster sand ranges from 1:3 to 1:5;

the retarder is present at 1–60 oz/CWT;

the viscosifier concentration dosage ranges from 1–5 lb/cubic yard when said viscosifier is selected from the group consisting of hydroxypropyl methylcellulose and polysaccharide gum and ranges from 1 to 100 g/cubic yard when said viscosifier is an ethylene oxide polymer; and water is present at a concentration of 40–50 gallons/cubic yard.

12. The method of claim 11, wherein the cement to sand ratio is 1:3.75 to 1:4.

13. The method of claim 11, wherein the viscosifier is hydroxypropyl methylcellulose or a polysaccharide gum and the dosage is from 5–25 lbs/cubic yard.

14. The method of claim 11, wherein the viscosifier is hydroxypropyl methylcellulose or a polysaccharide gum and the dosage is from 1–5 lbs/cubic yard.

15. The method of claim 11, wherein the retarder is present at less than 20 oz/CWT.

16. The method of claim 15, wherein the retarder is present at less than 10 oz/CWT.

17. A method of utilizing a ready-to-use stucco composition, comprising:

(a) preparing at a first location a stucco composition comprising portland cement-containing hydraulic cement, plaster sand, a viscosifier, a retarder and water;

(b) transferring said stucco composition to a second location, wherein (i) said retarder is present in an amount sufficient to provide said stucco composition with a useful life during which said stucco composition is workable, said useful life of a duration that is at least equal to a pre-application period, which includes delivery of said stucco composition to the second location, and an application period at said second location;

(ii) said viscosifier is present in an amount sufficient to retain enough water during said useful life to allow said stucco composition to harden after said application period; and (c) applying said stucco composition to a surface at said second location.

18. The method of claim 17, wherein said first location is a commercial concrete plant.

19. The method of claim 17, wherein said stucco composition is transferred from said first location to said second location in a ready-mix concrete truck.

20. The method of claim 17, wherein said applying step comprises applying said stucco composition to said surface as a single coat, said single coat satisfying structural and mechanical characteristics of a scratch and a brown coat.

21. The method of claim 17, wherein said useful life is at least 72 hours long.

22. The method of claim 17, wherein said useful life is at least 48 hours long.

23. The method of claim 17, wherein said useful life is at least 24 hours long.

24. The method of claim 17, wherein said useful life is less than 8 hours long.

25. A ready-to-use stucco composition, comprising:
   (a) a portland cement-containing hydraulic cement and plaster sand having a particle size no greater than U.S. sieve #4, wherein the ratio of said hydraulic cement and said plaster sand ranges from 1:3 to 1:5;
   (b) a retarder at a concentration dosage ranging from 1–60 oz/CWT;
   (c) a viscosifier at a concentration dosage ranging from 1–5 lb/cubic yard when said viscosifier is selected from the group consisting of hydroxypropyl methylcellulose and polysaccharide gum and ranges from 1 to 100 g/cubic yard when said viscosifier is an ethylene oxide polymer;
   (d) water at a concentration of 40 to 50 gallons/cubic yard; and
   (e) wherein said stucco composition has a useful life of at least four hours at a temperature of between 50 and 100° F.

26. The stucco composition of claim 25, wherein said hydraulic cement is a Type S masonry cement.

27. The stucco composition of claim 25, wherein said hydraulic cement is a Type I–II portland cement.

28. The stucco composition of claim 25, wherein said ratio of said hydraulic cement and said plaster sand is 1:3.75 to 1:4.

29. The stucco composition of claim 25, wherein the retarder satisfies ASTM C-494.

30. The stucco composition of claim 25, wherein said stucco composition further comprises a fiber for increasing adhesion of said stucco composition and cohesion between said stucco composition and a surface to which the stucco composition is applied.

31. The stucco composition of claim 25, wherein said stucco composition further comprises one or more additives selected from the group consisting of a shrinkage reducing admixture, a water reducing agent, an air entraining agent and a set accelerator.

32. The stucco composition of claim 25, wherein said useful life is at least 5 hours and wherein the amount of retarder varies from 0.5 to 10 oz/CWT.

33. The stucco composition of claim 25, wherein said useful life is at least 10 hours and wherein the amount of retarder varies from 3–16 oz/CWT.

34. The stucco composition of claim 25, wherein said useful life is at least 24 hours and wherein the amount of retarder varies from 5–25 oz/CWT.

35. The stucco composition of claim 25, wherein said stucco composition can be applied as a single coat that satisfies the structural and mechanical requirements of a scratch coat and a brown coat.

* * * * *